(12) United States Patent
Honselmann et al.

(10) Patent No.: US 8,127,911 B2
(45) Date of Patent: Mar. 6, 2012

(54) CLUTCH ACTUATION GUIDE SLEEVE AND RELEASE BEARING ASSEMBLY FOR A DUAL CLUTCH TRANSMISSION

(75) Inventors: Sebastian Honselmann, Buehlertal (DE); Dominik Hans, Muggensturm (DE); Simon Ortmann, Rheinau-Linx (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 12/757,539

(22) Filed: Apr. 9, 2010

(65) Prior Publication Data
US 2010/0193321 A1 Aug. 5, 2010

Related U.S. Application Data

(63) Continuation of application No. PCT/DE2008/001541, filed on Sep. 15, 2008.

(30) Foreign Application Priority Data

Oct. 11, 2007 (DE) .......................... 10 2007 048 712

(51) Int. Cl.
*F16D 23/14* (2006.01)
*F16D 21/06* (2006.01)
(52) U.S. Cl. ........................................ 192/98; 192/48.8
(58) Field of Classification Search .................. 192/98, 192/48.606, 48.8
See application file for complete search history.

(56) References Cited

U.S. PATENT DOCUMENTS

| | | | | |
|---|---|---|---|---|
| 3,212,611 A | * | 10/1965 | Ruoff et al. | 192/48.8 |
| 4,579,211 A | | 4/1986 | Renaud | |
| 4,637,506 A | * | 1/1987 | Billet | 192/110 B |
| 6,343,683 B1 | * | 2/2002 | Aoki et al. | 192/98 |
| 6,644,451 B2 | * | 11/2003 | Grosspietsch et al. | 192/48.8 |
| 6,854,578 B2 | * | 2/2005 | Dittmer et al. | 192/98 |
| 2002/0014385 A1 | | 2/2002 | Grosspietsch | |
| 2005/0155835 A1 | * | 7/2005 | Hans | 192/87.11 |
| 2005/0217963 A1 | * | 10/2005 | Lindenschmidt et al. | 192/85 CA |
| 2007/0205073 A1 | * | 9/2007 | Otto et al. | 192/98 |

FOREIGN PATENT DOCUMENTS

| | | | |
|---|---|---|---|
| FR | 2 859 773 A | | 3/2005 |
| GB | 1 348 645 A | | 3/1974 |
| GB | 2096262 A | * | 10/1982 |

* cited by examiner

*Primary Examiner* — David D Le
*Assistant Examiner* — Jacob S Scott
(74) *Attorney, Agent, or Firm* — Lucas & Mercanti, LLP

(57) ABSTRACT

An actuation system for a double clutch. The actuation system has a guide sleeve disposed around transmission input shafts of a double-clutch transmission which is connected downstream and two cylindrical elements which are disposed on the sleeve axially displaceably by an actuator unit, each for actuating the clutches. The cylindrical elements can be displaced independently from each other, are locked into position, and overlap each other.

5 Claims, 3 Drawing Sheets

CLUTCH ACTUATION GUIDE SLEEVE AND RELEASE BEARING ASSEMBLY FOR A DUAL CLUTCH TRANSMISSION

This application is a continuation application of PCT/DE2008/001541 filed Sep. 15, 2008, which in turn claims the priority of DE 10 2007 048 712.8, filed Oct. 11, 2007, the priority of these applications is hereby claimed and these applications are incorporated by reference herein.

FIELD OF THE INVENTION

The invention relates to an actuation system for actuating a dual clutch by means of a concentric arrangement of the actuation system around the transmission input shafts of a downstream dual clutch transmission and a drive by means of an actuator unit arranged radially outside.

BACKGROUND OF THE INVENTION

For the actuation of dual clutches, the prior art proposes actuating cylindrical elements nested radially one inside the other and arranged around the transmission input shafts of a downstream dual clutch transmission, which actuating cylindrical elements exert a load, at different diameters, in each case on a lever system, for example a plate spring, of a clutch and close or open said clutch, depending on whether said clutch is of the forced-open or forced-closed type, by means of an axial displacement of the lever system. Here, the cylindrical elements may on the one hand be displaced axially mechanically by means of levers, with it being possible for said levers in turn to be driven hydraulically or electrically. Alternatively, the cylindrical elements may be designed as annular elements of a slave cylinder and displaced by means of a pressure change in two mutually separate pressure chambers in which the annular cylindrical elements are arranged in a sealing and displaceable fashion.

An actuation system with externally driven levers is known for example from FR 2 859 773 A. To be able to operate the two cylindrical elements, which exert a load on the lever systems of the clutches, independently of one another, one cylindrical element is held radially within, and the other outside, a guide sleeve which is fastened to the transmission housing wall. Here, the cylindrical elements, which are displaced axially by actuator units, exert a load on the lever systems of the clutches and are themselves loaded by levers which are actuated by the actuator units. To actuate the cylindrical element arranged radially within the guide sleeve, longitudinal slots are provided in the guide sleeve for this purpose, through which slots the lever engages by means of corresponding molded portions for exerting a load on the lever.

It is an object of the invention to refine the prior art with regard to externally driven actuation systems for dual clutches. In particular, it is sought to provide a simple design, which is easy to assemble, in conjunction with functionally reliable operation even under robust conditions.

SUMMARY OF THE INVENTION

The object is achieved by means of an actuation system for actuating a dual clutch, having two clutches, which can be actuated axially by means of a lever system, for a dual clutch transmission, having a guide sleeve which is arranged around at least one transmission input shaft of the dual clutch transmission and which is held on the dual clutch transmission, and two cylindrical elements which are held on said guide sleeve and which exert a load on in each case one lever system of a clutch and which can be displaced axially along the guide sleeve by in each case one actuator unit, wherein each cylindrical element is arranged in a rotationally fixed manner radially at the outside on the guide sleeve, and functional elements of the cylindrical elements axially overlap.

As a result of the arrangement of the two cylindrical elements radially outside the guide sleeve, said cylindrical elements may be located relatively close to the transmission input shafts of the dual clutch transmission, so as to permit a compact overall design of the guide sleeve. Furthermore, the guide sleeve may be formed without cutouts and may therefore be structurally stable and designed for high mechanical demands. Possible starting points for vibration cracks, structurally defined by apertures or recesses in the guide sleeve, may be eliminated. Furthermore, the two levers for exerting load on the cylindrical elements can be of simple design, since the two extensions, to be loaded by said levers, on the cylindrical elements are flange parts situated at the outside. It is not necessary to give any special consideration for example to tolerances to be adhered to, friction influences, wear, vibration behavior, and static and the like during engaging-through of the lever radially within the guide sleeve.

Instead, according to the invention, the cylindrical elements, before the rotation of the cylindrical elements for example as a result of a drag torque transmitted to the cylindrical elements by the rotating clutch, and the independence of the cylindrical elements during a movement for independent actuation of the two clutches, are released by virtue of the two cylindrical elements being rotationally fixedly supported on the guide sleeve and the functional elements of said cylindrical elements overlapping in such a way that both the axial installation space and the radial installation space can be kept small. The cylindrical elements thus overlap axially and radially, such that the installation space taken up by the actuation system, aside from the additional lever, is not significantly larger than that for a single release unit of this design.

Each cylindrical element substantially requires two functional elements, specifically a load exertion region for the lever system of the clutch actuated by the cylindrical element, and a load exertion region for the lever of the actuator unit exerting a load on the cylindrical element. Additionally, a further functional element in the form of an end stop may be provided, which end stop limits the travel of the cylindrical element in the axial direction at one side or at both sides. The concept of the invention consists in grouping together the load exertion regions for the lever systems on the one hand and the load exertion regions for the lever systems of the actuator units on the other hand, and said groups being spaced apart from one another by means of circumferential segments, which alternate over the circumference and which are assigned to the individual cylindrical elements, in such a way that the two cylindrical elements, during an actuation of the clutches, can independently of one another cover the distance between the two load exertion regions in an unhindered manner.

To be able to ensure simple assembly, one of the two cylindrical elements may be of two-part design, such that said cylindrical element may be threaded into the other cylindrical element in such a way that the two load exertion regions can be grouped with one another. The prevention of rotation may be provided in that the guide sleeve, as viewed in cross section, has a rotationally asymmetrical profile, with the cylindrical elements being formed so as to match this profile. For example, the guide sleeve may have one or more beads which run axially, that is to say are aligned in the actuating direction of the clutches, on which the cylindrical elements are rotationally fixedly held by means of corresponding molded portions of complementary design. The guide sleeve may for this purpose be formed from sheet metal and may correspondingly be produced by means of a deep-drawing process. The beads may be formed in the radially outward or radially inward direction. Correspondingly, the cylindrical elements have outwardly molded portions or inwardly molded portions. The cylindrical elements may be parts produced from plastic, preferably reinforced plastic, by means of an injection molding process, may be formed from metal by punching, forging, sintering or a sheet-metal shaping process, or may be formed from light metals by means of a pressure die casting process. Individual parts may be connected by means of joining processes such as latching, adhesive bonding, welding and/or riveting.

To limit the axial movement travel of at least one cylindrical element, an end stop region may be provided thereon. In the forced-closed clutches (pressed-closed clutches) which are preferably used in dual clutch transmissions, it may be advantageous, in order to place the engagement bearing on the lever system, for example a plate spring, under preload, to limit the movement travel in the opening direction of the clutch, such that when the clutch is open, the stress of the plate spring presses the cylindrical element against an end stop. Here, a suitable end stop can be supported on the transmission housing or on the guide sleeve, for example in the region of the radially widened rim for fastening said guide sleeve to the transmission housing.

To reduce the friction of the parts against one another, said parts may be coated, for example with Teflon-containing sliding layers, diamondlike carbon (DLC) and the like. It is self-evident that sliding materials advantageously used in the field of plain bearing technology may likewise be used to reduce the friction coefficient and for permanent lubrication.

BRIEF DESCRIPTION OF THE DRAWINGS

The invention is explained in more detail on the basis of FIGS. 1 to 10, in which.

DETAILED DESCRIPTION OF THE INVENTION

Figure 1:
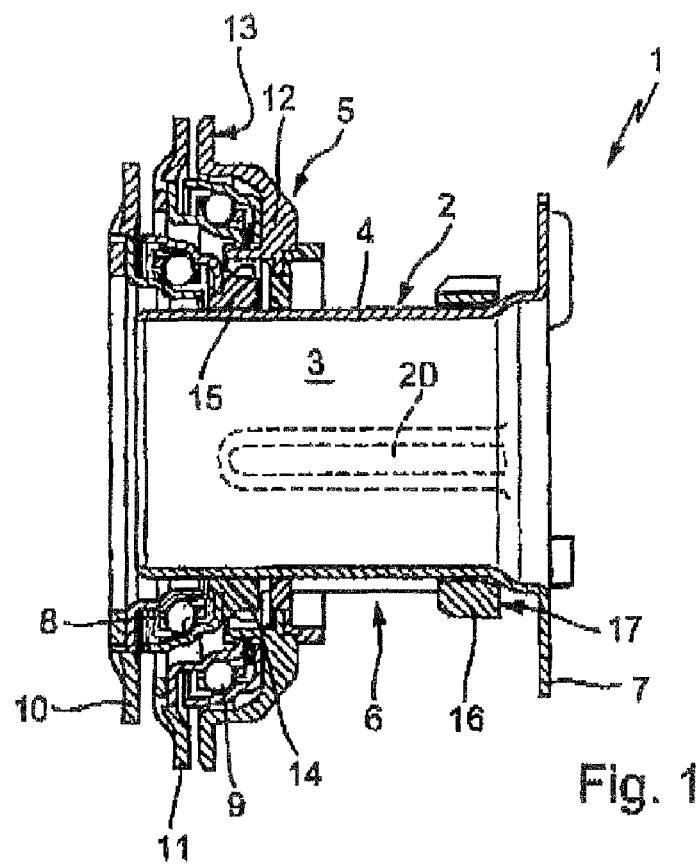
FIG. 1 shows a longitudinal section through an exemplary embodiment of an actuation system.

FIG. 1 shows a possible exemplary embodiment of an actuation system 1 having a guide sleeve 2, for example in the case of two pressed-closed clutches being used, with the clutches closed. The guide sleeve 2 has a tubular section 4 with a leadthrough 3 for the transmission input shafts, nested one inside the other as a shaft and a hollow shaft in the conventional way, of the dual clutch gearbox, which tubular section 4 holds and guides the two cylindrical elements 5, 6. At the side facing away from the clutches, the guide tube is widened radially such that a rim 7 is formed, which rim 7 is fastened, centered with respect to the transmission input shafts, to the transmission housing wall (not illustrated).

The two cylindrical elements 5, 6, at their end facing away from the rim 7, hear in each case one rolling bearing 8, 9 which serves as an engagement bearing in the case of a pressed-closed clutch and as a release bearing in the case of pressed-open clutches and enables the lever systems, such as plate springs, adjoining the rolling bearings 8, 9 to be loaded on in a rotatable manner by the cylindrical elements 5, 6. To adapt the effective diameter of the rolling bearings 8, 9 to that diameter of the lever systems of the clutches which is to be loaded, a thrust ring 10, 11 may be provided on one or both rolling bearings.

In the exemplary embodiment shown, the load exertion region 12 for the lever system of the clutch is provided with the rolling bearing 9, and the load exertion region 13 for the lever of the actuator unit is provided on a part, while the cylindrical element 6 is formed from a separate component 14 with the load exertion region 15 for the lever system for the clutch, which lever system bears the rolling bearing 8, and from a separate component 16 with the load exertion region 17 for the lever of the actuator unit. The rolling bearings 8, 9 are fastened, for example in the manner of a claw connection, clamped or clipped, to the load exertion regions 12, 15 of the two cylindrical elements 50 6.

The actuator units (not illustrated) which are assigned to the individual cylindrical elements 5, 6, and which may exert a force on a lever or on some other design of force-transmitting element electrically, hydraulically, electrohydraulically or pneumatically, move in each case one lever (not illustrated) by means of said force, which lever is supported fixedly with respect to the housing, for example on the transmission housing or on the clutch bell housing, and transmits a lever force to the load exertion regions 13, 17, as a result of which the latter are axially displaced axially along the tubular section 4 and transmit the force via the rolling bearings 8, 9 to the lever systems of the clutches assigned thereto, as a result of which said clutches are actuated, that is to say are disengaged or engaged depending on the type of clutches. The reversal of said actuating process takes place by means of the clutches in a force-assisted manner, since the lever system is preloaded during the actuating process. In the example shown, two opposite beads 20, which are embossed in the outward direction from the inside, are provided in the guide sleeve for guiding and for the rotational fixing of the cylindrical elements 5, 6, which beads 20 support the load torque acting on the cylindrical elements 5, 6 via the rolling bearings 8, 9 in the rotational direction of the clutches. It is self-evident that the beads 20 may also be embossed radially inward if allowance is made for corresponding radial installation space between the transmission input shafts and the guide sleeve.

Figure 2:
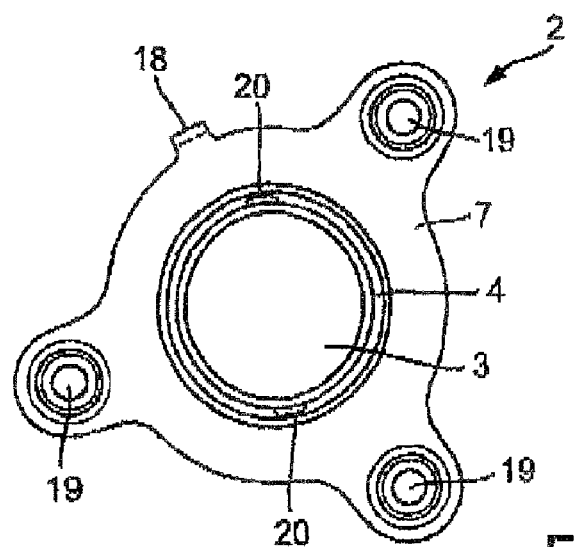
FIG. 2 shows a view of a guide sleeve.

FIG. 2 shows a plan view of the guide sleeve 2 of FIG. 1 with the opening 3, the radially widened rim 7 and the tubular section 4 with the beads 20. Provided on the rim 7 is a positioning aid 18 in the form of a turned-out and angled tongue which engages into an opening provided in the transmission housing, and the guide aid is positioned on the transmission housing and is subsequently centered on the transmission input shafts. In a kinematic reversal, a pin may be provided in the transmission housing, which pin engages with centering play into a corresponding opening provided in the guide sleeve. The openings 19 may contain bushings and serve to hold the guide sleeve on the transmission housing by means of screws or rivets.

Figure 3:
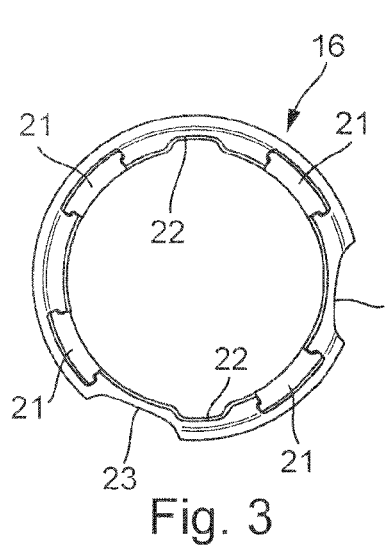
FIGS. 3 to 5 show different illustrations of a part of a first cylindrical element.
Figure 4:
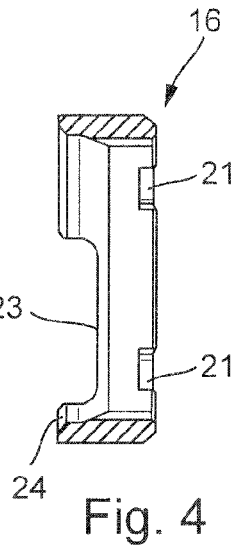
Figure 5:
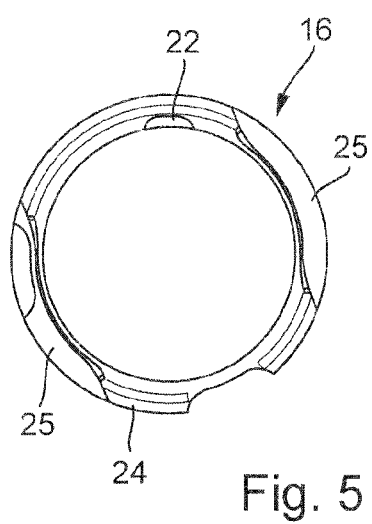

FIGS. 3 to 5 show the component 16 which forms the cylindrical element 6 in a front view (FIG. 3), as a longitudinal section (FIG. 4) and in a rear view (FIG. 5). FIG. 3 clearly shows the recesses 21 which are aligned in the direction of the second component 14 which forms the cylindrical element 6, which recesses 21 are distributed over the circumference and hold the arms, which are aligned in the direction of the component 16, of the component 14. Provided between in each case two recesses 21 as viewed in the circumferential direction are the grooves 22 which match the beads 20 (FIG. 1) of the guide sleeve and serve to provide rotational fixing for the cylindrical element 6. The recesses 23 serve to release the lever of the actuator unit for the actuation of the cylindrical element 5. if for example the cylindrical element 5 is moved back in the direction of the rim 7 (FIG. 1), in order that the lever can at least partially axially overlap the component 16 and therefore axial installation space can be saved.

FIG. 4 shows the position of the recesses 21 and 23 and a stop 24, which is matched to the profile of the guide sleeve in the region of the transition to the rim 7 (FIG. 1), for the cylindrical element 5 (FIG. 1). The maximum distance which can be traveled by the cylindrical element 5 is designed here such that the elastic lever system of the clutch is still not fully relieved of load when the stop 24 on the guide sleeve is reached, such that the rolling bearing remains under preload in order to reduce noises.

FIG. 5 shows, in addition to the stop 24 and the recesses 22, further recesses 25 which are formed over a part of the circumference and the axial width of the component 16 and which form the contact surfaces for the lever of the actuator unit. The angle of the levers with respect to one another may be varied such that outwardly projecting actuator units do not hinder one another, or can be adapted to the transmission structure and geometry. Furthermore, the levers may also be provided in alignment with one another and nested one inside the other, in particular if both actuator units are combined to form a structural unit.

Figure 6:
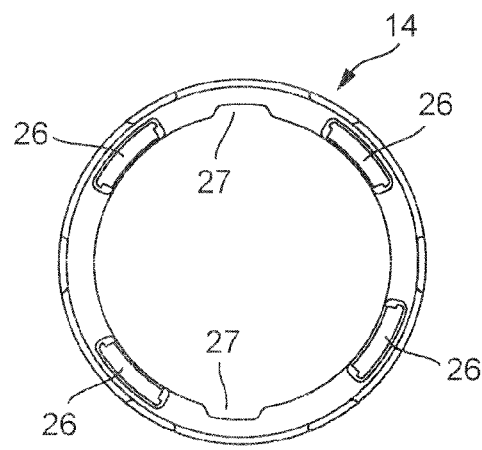
FIGS. 6 and 7 show different illustrations of another part of a first cylindrical element.
Figure 7:
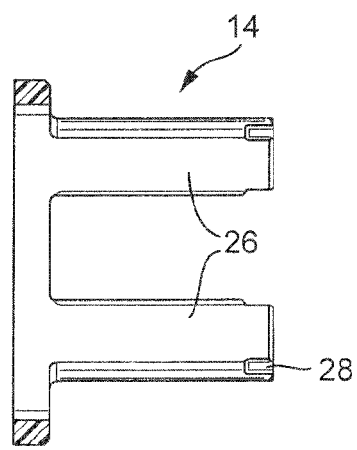

FIGS. 6 and 7 show the second component 14 which forms the cylindrical element 6 of FIG. 1 with arms 26, which project in the direction of the component 16 and are in sliding contact with the guide sleeve 2 (FIG. 1), in a front view (FIG. 6) and in longitudinal section (FIG. 7). The component 14 likewise has recesses 27 for guidance on the beads 20 (FIG. 1). The arms 26 have, at their ends, latching devices 28 which generate a positively locking action with the recesses 21 of the component 16 (FIG. 3). Alternatively, if metal parts are used, it is for example possible to select a fit, since the parts are not loaded under tension. Further joining methods such as adhesive bonding, welding, for example ultrasound welding, or riveting may likewise be advantageous.

Figure 8:
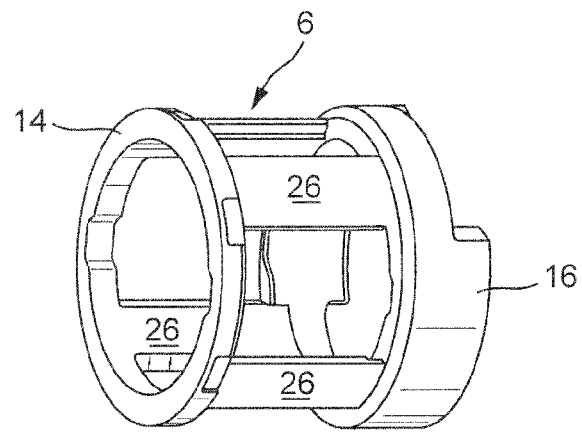
FIG. 8 shows an assembled first cylindrical element.

The cylindrical element 6 assembled from the components 14, 16 is illustrated in FIG. 8. Forming the cylindrical element 6 in two parts has advantages in particular with regard to assembly; because the two cylindrical elements 5 and 6 (FIG. 1) overlap axially, the cylindrical element 5 is, before assembly (not shown here), plugged over the arms 26 of the component 14. Only then are the two parts 14, 16 joined together and plugged onto the guide sleeve 2 (FIG. 1).

Figures 9, 10:
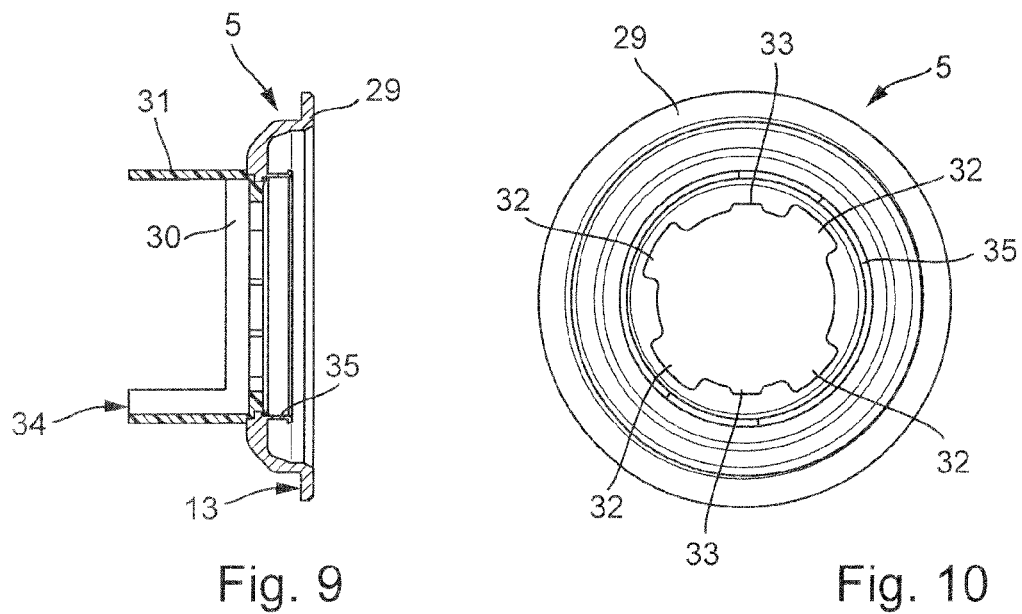
FIGS. 9 and 10 show different illustrations of a second cylindrical element.

FIGS. 9 and 10 show the cylindrical element 5 of FIG. 1 in longitudinal section (FIG. 9) and in a front view (FIG. 10). The cylindrical element 5 may be formed in one piece from plastic or metal; in the exemplary embodiment of FIGS. 9 and 10, said cylindrical element 5 is formed in two parts from a cylindrical element base 29 and a cylindrical element skirt 30 with two axially widened arms 31 situated preferably circumferentially opposite one another, which arms 31 are widened in terms of their radial diameter in such a way that they axially overlap the component 16 (FIG. 4) and, with their face-side ends, form in each case one stop 34 corresponding to the stops 24 of the component 24 (FIG. 5) 34 for travel limitation of the cylindrical element 5. The cylindrical element 5 may have further axial arms for guidance on the guide sleeve. For this purpose, it would be necessary to provide corresponding apertures in the cylindrical element 6. In the illustration, the cylindrical element 5 is held merely with its inner diameter on the guide sleeve 2 (FIG. 1) so as to enable a certain degree of pivotability with respect to the guide sleeve. For the axial leadthrough of the arms 26 of the component 14 belonging to the cylindrical element 6, the cylindrical element base 29 has recesses 32. Provided in the circumferential direction between in each case two recesses 32 are two further recesses 33 for the beads 20 (FIG. 1), which in the exemplary embodiment shown are of radially elevated design, for the rotational fixing of the cylindrical element 5 of the guide sleeve. The load exertion region 13 forms the contact surface for the lever—not illustrated—of the actuator unit assigned to said cylindrical element 5. The extension 35 integrally formed on the cylindrical element base 29 serves to hold the rolling bearing which is in contact with the lever system of the clutch. The load exertion region 13 axially overlaps the extension 35 such that the contact surface of the rolling bearing is at virtually the same axial level as the load exertion surface of the load exertion region 13, and therefore axial installation space can be saved.

The cylindrical element base 29 may he produced from metal or plastic. The cylindrical element skirt 30 with the arms 31 is preferably produced from plastic. To produce the cylindrical element 5, the cylindrical element base 29 may he extrusion-coated with the cylindrical element skirt 30 in an injection molding process.

The cylindrical elements 5 and 6 are guided by means of their arms 26 (FIGS. 5) and 34 axially on the guide sleeve 2 (FIG. 1) and in a rotationally fixed manner by means of the beads 20 formed in the guide sleeve. In this way, to minimize friction, in each case one axial gap may be provided between the arms 26, 34. If the guide surface of the arms is to be enlarged, the arms may also bear against one another in sliding contact. Corresponding measures for reducing the generated sliding contact, such as greasing and/or applying a sliding layer, may advantageously be provided.

1 Actuating device
2 Guide sleeve
3 Leadthrough
4 Section
5 Cylindrical element
6 Cylindrical element
7 Rim
8 Rolling bearing
9 Rolling bearing
10 Thrust ring
11 Thrust ring
12 Load exertion region
13 Load exertion region
14 Component
15 Load exertion region
16 Component
17 Load exertion region
18 Positioning aid
19 Opening
20 Bead
21 Recess
22 Groove
23 Recess
24 Stop
25 Recess
26 Arm
27 Recess
28 Latching device
29 Cylindrical element base
30 Cylindrical element skirt
31 Arm
32 Recess 33 Recess
34 Stop
35 Extension

The invention claimed is:

1. An actuation system for actuating a dual clutch, which has two clutches that are each actuateable axially by a lever system for a dual clutch transmission, the actuation system comprising:
a guide sleeve which is arrangeable around at least one transmission input shaft of the dual clutch transmission and which is held on the dual clutch transmission; and
two cylindrical elements which are held on the guide sleeve, which each exert a load on the lever system of each of the clutches and which are each displaceable axially along the guide sleeve by an actuator unit,
wherein each of the cylindrical elements are arranged in a rotationally fixed manner radially at an outside on the guide sleeve, and functional elements of the cylindrical elements axially overlap,
wherein the guide sleeve has at least one axially running head on which the cylindrical elements are guided in a rotationally fixed manner, and
wherein one of the cylindrical elements is formed from two separate components, including a first component and a second component and the first component has a plurality of circumferentially distributed recesses.

2. The actuation system of claim 1, wherein the functional elements are a load exertion region for the lever system and a load exertion region for the actuator unit and an end stop region.

3. The actuation system of claim 1, wherein at least one of the cylindrical elements has an end stop region which limits a movement travel of the piston in a direction of a receptacle of the guide sleeve.

4. The actuation system of claim 1, wherein the second component has arms with latching devices.

5. The actuation system of claim 4, wherein the arms of the second component project into the recesses of the first component and the latching devices of the arms of the second component fasten the second component to the first component.

* * * * *